(12) United States Patent
Varadhan et al.

(10) Patent No.: US 10,659,234 B2
(45) Date of Patent: May 19, 2020

(54) DUAL-SIGNED EXECUTABLE IMAGES FOR CUSTOMER-PROVIDED INTEGRITY

(71) Applicant: Cisco Technology, Inc., San Jose, CA (US)

(72) Inventors: Kannan Varadhan, San Jose, CA (US); Chirag Shroff, Cary, NC (US); Rakesh Chopra, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 171 days.

(21) Appl. No.: 15/386,120

(22) Filed: Dec. 21, 2016

(65) Prior Publication Data

US 2017/0230185 A1    Aug. 10, 2017

Related U.S. Application Data

(60) Provisional application No. 62/293,692, filed on Feb. 10, 2016.

(51) Int. Cl.
| | |
|---|---|
| *G06F 21/12* | (2013.01) |
| *G06F 21/44* | (2013.01) |
| *G06F 8/61* | (2018.01) |
| *G06F 8/65* | (2018.01) |
| *H04L 9/32* | (2006.01) |

(Continued)

(52) U.S. Cl.
CPC .............. *H04L 9/3263* (2013.01); *G06F 8/63* (2013.01); *G06F 8/65* (2013.01); *G06F 21/121* (2013.01); *G06F 21/44* (2013.01); *H04L 9/14* (2013.01); *H04L 9/30* (2013.01); *H04L 63/123* (2013.01); *H04L 63/126* (2013.01); *H04L 63/0823* (2013.01)

(58) Field of Classification Search
CPC .......... H04L 63/12–63/126; G06F 8/63; G06F 8/65; G06F 21/00–105; G06F 21/121; G06F 21/44; G06F 21/445
See application file for complete search history.

(56) References Cited

U.S. PATENT DOCUMENTS

| | | | | |
|---|---|---|---|---|
| 5,010,445 A | * | 4/1991 | Weinold ............... | H01H 15/005 361/728 |
| 6,988,250 B1 | | 1/2006 | Proudler et al. | |

(Continued)

OTHER PUBLICATIONS

Tim Roberts et al., "Driver Signing Practical Info", Windows System Software—Consulting, Training, Development—Unique Expertise, Guaranteed Results, 7 pages (Year: 2015).*

(Continued)

*Primary Examiner* — Daniel B Potratz
*Assistant Examiner* — D'Arcy Winston Straub
(74) *Attorney, Agent, or Firm* — Edell, Shapiro & Finnan, LLC

(57) ABSTRACT

In one embodiment, a computing device receives an image that has been signed with a first key, wherein the image includes a first computational value associated with it. A second computational value associated with the image is determined and the image is signed with a second key to produce a signed image that includes both the first and second computational values. Prior to loading the dual-signed image, the computing device attempts to authenticate the dual-signed image using both the first and second computational values, and, if successful, loads and installs the dual-signed image.

20 Claims, 12 Drawing Sheets

(51) Int. Cl.
  *H04L 29/06* (2006.01)
  *H04L 9/14* (2006.01)
  *H04L 9/30* (2006.01)

(56) References Cited

U.S. PATENT DOCUMENTS

| | | | |
|---|---|---|---|
| 7,127,067 B1 | 10/2006 | Wachtler et al. | |
| 7,526,785 B1 | 4/2009 | Pearson et al. | |
| 8,321,680 B2* | 11/2012 | Gantman | H04L 63/0478 |
| | | | 380/277 |
| 2003/0115471 A1* | 6/2003 | Skeba | H04L 63/0428 |
| | | | 713/180 |
| 2003/0120923 A1* | 6/2003 | Gilman | G06F 21/10 |
| | | | 713/170 |
| 2003/0196096 A1 | 10/2003 | Sutton | |
| 2004/0025010 A1* | 2/2004 | Azema | G06F 21/10 |
| | | | 713/156 |
| 2005/0021968 A1* | 1/2005 | Zimmer | G06F 21/572 |
| | | | 713/176 |
| 2005/0251857 A1 | 11/2005 | Schunter et al. | |
| 2008/0165952 A1 | 7/2008 | Smith et al. | |
| 2011/0167503 A1* | 7/2011 | Horal | G06F 21/10 |
| | | | 726/33 |
| 2012/0151223 A1 | 6/2012 | Conde Marques et al. | |
| 2013/0007437 A1 | 1/2013 | Shroni et al. | |
| 2014/0344581 A1* | 11/2014 | Grieco | G09C 1/00 |
| | | | 713/176 |
| 2014/0359268 A1* | 12/2014 | Jauhiainen | H04L 9/08 |
| | | | 713/2 |
| 2015/0254451 A1 | 9/2015 | Doane et al. | |
| 2017/0155514 A1* | 6/2017 | Schulz | H04L 63/06 |

OTHER PUBLICATIONS

International Search Report and Written Opinion in counterpart International Application No. PCT/US2017/016134, dated Apr. 24, 2017, 10 pages.

Tim Roberts et al., "Driver Signing Practical Info", Windows System Software—Consulting, Training, Development—Unique Expertise, Guaranteed Results, Sep. 2015, 7 pages.

John Kennedy et al., "SignTool", https://docs.microsoft.com/en-us/windows/desktop/SecCrypto/signtool, May 30, 2018, 10 pages.

* cited by examiner

DUAL-SIGNED EXECUTABLE IMAGES FOR CUSTOMER-PROVIDED INTEGRITY

PRIORITY CLAIM

This application claims priority to U.S. Provisional Application No. 62/293,692, filed Feb. 10, 2016, the entirety of which is incorporated herein by reference.

TECHNICAL FIELD

The present disclosure relates to providing secure software installation and upgrades on network devices.

BACKGROUND

As enterprise computing and networks continue to grow, it is often necessary for administrators/owners of these systems to ensure that the images loaded and executed on the network devices have not be altered or tampered with my malicious parties. In certain deployments, such as government and financial networks, for example, there is a requirement that network devices provide secure and continuous services. This, however, can be difficult to enforce, particularly when the software running on customer premises equipment ("CPE") needs to be upgraded or patched due to security concerns. Given the central role that network devices serve in the operation of critical infrastructures, therefore, an owner/administrator of a network device may need to authenticate any software running on the device prior to deploying it.

DESCRIPTION OF EXAMPLE EMBODIMENTS

Overview

In accordance with one embodiment, a computing device receives an image that has been signed with a first key, wherein the image includes a first computational value associated with it. A second computational value associated with the image is determined and the image is signed with a second key to produce a dual-signed image that includes both the first and second computational values. Prior to loading the dual-signed image, the computing device attempts to authenticate the dual-signed image using both the first and second computational values, and, if successful, installs the dual-signed image.

Example Embodiments

Figure 1:
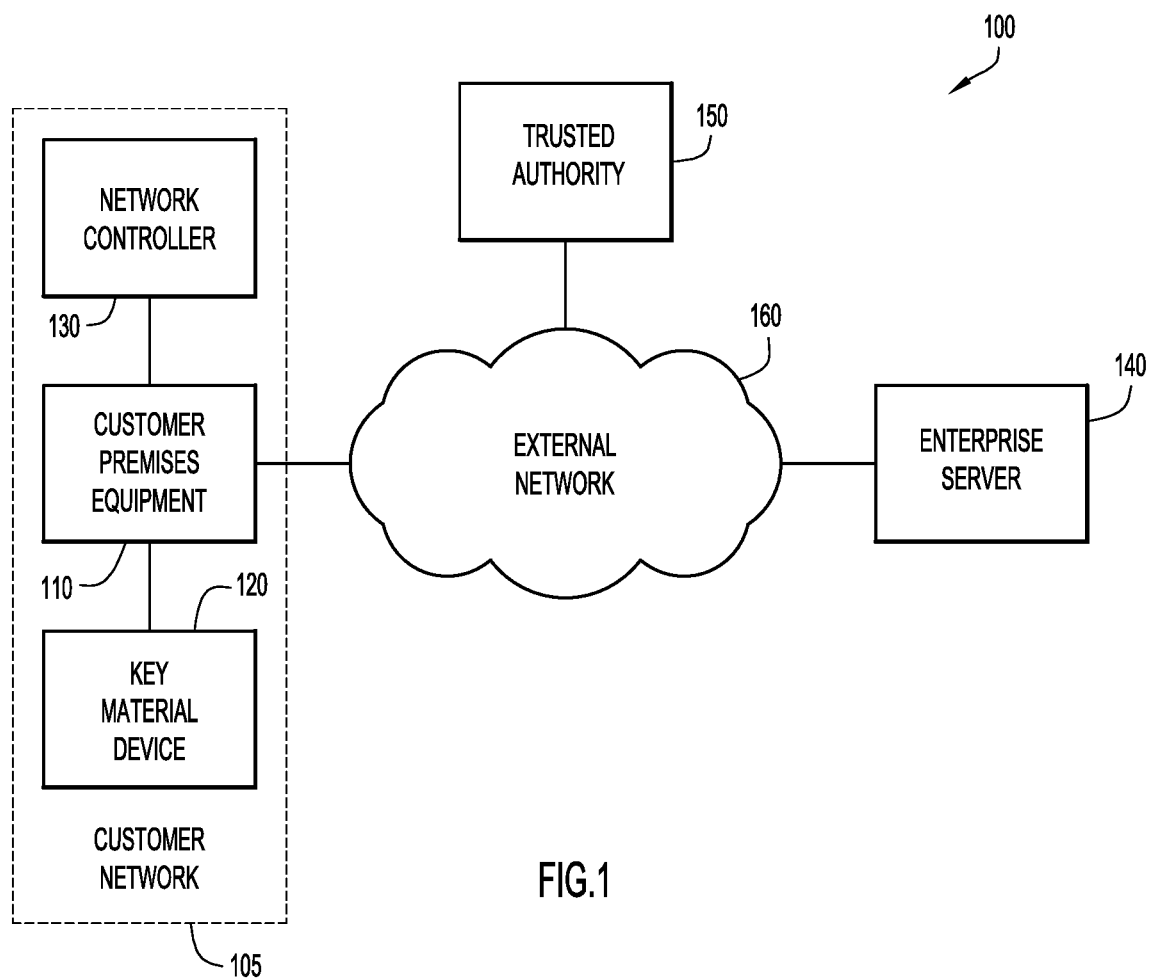
FIG. 1 is a high-level diagram illustrating a network security management system in which an image on a network device is verified, according to an example embodiment.

With reference first to FIG. 1, there is depicted a block diagram of a customer premises entity ("CPE") security management system 100 that includes a customer network 105 that in turn includes a CPE device 110, customer key material device 120, and a network controller 130. Also part of the system 100 is an enterprise server 140 and a trusted authority 150, which are connected to an external network 160 with which the CPE device 110 has connectivity. As shown in FIG. 1, CPE device 110 is in direct communication with key material device 120 and is in communication with a network controller 130. CPE device 110 is also in communication with enterprise key server 140 and trusted authority 150 over external network 160. CPE device 110 may be a field replaceable unit (FRU) in a modular customer system that is monitored by network controller 130, and may be moved around customer network 105. CPE device 110 may receive key material associated with owner/administrator of CPE device 110 directly from key material device 120, which may be a Universal Serial Bus (USB) stick or other memory device that may be inserted directly into the CPE device 110. CPE device 110 also may receive public key material associated with a known enterprise entity from enterprise server 140, and may further receive images, and/or updates of images, signed with private key material associated with the known enterprise entity from the enterprise server 140. It should be understood that an enterprise entity may be the manufacturer of CPE device 110 or any other trusted source known to the owner/administrator of CPE device 110. The system 100 may be configured such that neither enterprise server 140 nor trusted authority 150 is in a critical path for a customer to install key material stored on key material device 120, or to modify encryption keys previously stored on CPE 110. Accordingly, a customer may install encryption keys and certificates on CPE device 110 on a per-device basis, so that a compromise on CPE device 110 does not affect other customer devices in customer network 130.

In deployments such as those shown in FIG. 1, it may be desirable for customers or system administrators to be able to limit the installation of images on a CPE device to only those images that have been validated and signed by both the manufacturer and the administrator/owner of the CPE device. To enforce security and data integrity, it also may be desirable to require the physical presence of a user/administrator prior to loading key material onto the CPE device.

Generally, a user/administrator may add multiple platform keys (PKs) and key exchange keys (KEKs) stored on customer key material device 120 to a key store on CPE device 110 such that PKs and KEKs associated with both a known enterprise entity and an owner/administrator of CPE device 110 and stored on CPE device 110 may be used to authenticate an image before the image is installed onto CPE device 110. It should be appreciated that an enterprise entity may be any entity that is a trusted source including, but not limited to, the manufacturer of CPE device 110, and an owner/administrator may be any entity that has physical dominion and control over CPE device 110 including, but not limited to, a customer who purchased CPE device 110. It should be further appreciated that any set of suitable certificates or keys may be used to authenticate an image or application prior to being installed on CPE device 110.

Furthermore, if CPE device 110 is moved around customer network 130, customers/administrators may modify contents of a key store to reinitialize the image on CPE device 110. According to an embodiment, as discussed in more detail below, system 100 may be configured such that customers may be required to establish a physical presence before being allowed to modify or customize the contents of one or more of the key stores resident on CPE device 110.

System 100 may be configured such that enterprise key material may be pre-populated onto CPE device 110, or may be further configured such that enterprise key server 140 may install or modify enterprise key material on CPE device 110 via external network 160. CPE device 110 may further request a valid certificate from trusted authority 150, via external network 160, to authenticate the enterprise key material, enabling CPE device 110 to verify that a bootable image stored on CPE device 110 was signed by a known enterprise entity. After CPE device has authenticated the enterprise key material, as discussed further below, CPE device may use the enterprise key material to decrypt a signed hash value of the image to determine whether the image has been tampered with or altered by a third party.

It is to be understood that there may be multiple customer sites/networks 130 in FIG. 1, wherein each customer site/network 130 may include one or more CPE devices 110.

The CPE security management system 100 allows an owner/administrator entity to sign and authenticate a bootable image on one or more CPE devices 110 and to verify that the image has been signed by both an enterprise entity and the owner/administrator entity before the image may be installed on the one or more CPE devices 110. System 100 further provides a mechanism to require physical proximity to a CPE device 110 before key material associated with the owner/administrator entity may be installed or modified on the CPE device 110.

Figure 2:
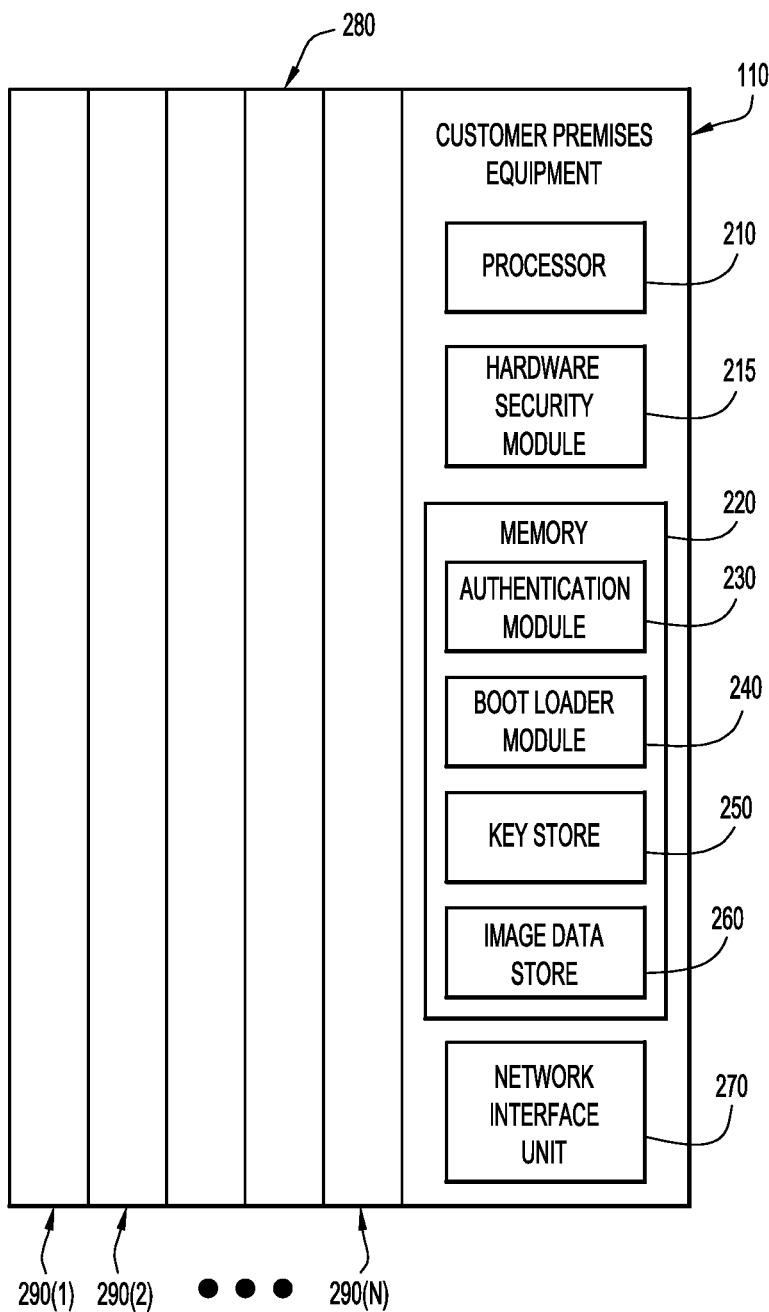
FIG. 2 is a block diagram of a customer premises equipment device configured to participate in operations of the network security management system, according to an example embodiment.

Reference is now made to FIG. 2, which shows the CPE device 110 of FIG. 1 in more detail. The CPE device 110 is a computing device. As shown in FIG. 2, CPE device 110 includes one or more processors 210, a memory 220, one or more network interface units 270, and a chassis 280 having one or more line card slots housing one or more slot cards 290(N). To this end, memory 210 stores executable software instructions for authentication module 230, hardware security module 215, and boot loader module 240, and stores data for key store 250 and image data store 260. The one or more processors 210 may be a microprocessor or a microcontroller. The one or more network interface units 270 may take the form of network interface cards that enable network communication, such as wired or wireless network communication, to communicate with other devices in customer network 130, enterprise key server 140, and/or trusted authority 150. The one or more slot cards 290(N) may each have various hardware capable of independently handling switching and/or routing functionalities. While not shown as such in FIG. 2, it is therefore possible that each of the slot cards 290(1)-290(N) may each include a processor 210, a memory 220 storing authentication module 230, boot loader 240, key store 250 and image data store 260, and a network interface 270. According to an embodiment, the CPE device may be a network device, e.g., switch, router, etc., capable of switching and/or routing traffic within customer network 105. The memory 220 may include read only memory (ROM), random access memory (RAM), magnetic disk storage media devices, optical storage media devices, flash memory devices, electrical, optical, or other physical/tangible memory storage devices. Thus, in general, memory 210 may include one or more tangible (non-transitory) computer readable storage media (e.g., a memory device) encoded with software comprising computer executable instructions and when the software is executed (by processor 210) it is operable to perform the operations of the CPE device 110 described herein.

Authentication module 230 includes instructions for authenticating that an image has been signed by both a known enterprise entity and an owner/administrator entity, and boot loader module 240 is responsible for booting an image after it has been authenticated by authentication module 230. Processor 210 may execute instructions for authentication module 230 and boot loader module 240. For example, processor 210 may execute instructions causing authentication module 230 to authenticate an image stored in image data store 260.

Hardware security module 215 is configured to generate a digital signature to be applied to an image and/or a computational value, e.g., a hash, of an image. Specifically, hardware security module 215 is configured to generate a signature using a private key associated with device 110 and provides a public key uniquely associated with the private key that enables the authentication module 230 to verify that a given signature was generated by hardware security module 215. Hardware security module 215 is further configured to safeguard and manage digital keys for authenticating both the enterprise entity and the owner/administrator of CPE device 110. According to an embodiment, hardware security module 215 may be a plug-in card residing on CPE device 110 or may be an external device that attaches directly to CPE device 110. According to a further embodiment, the functionality of hardware security module 215 may be performed offline by the manufacturing or enterprise entity, e.g., during a build process of CPE device 110 at the manufacturing or enterprise entity premises.

In general, the disclosed embodiments provide a secure environment in which an owner/administrator may take "ownership" of CPE device 110 by generating owner device-specific certificates, downloading and verifying trusted images and packages, signing the trusted packages and images, and authenticating and preparing an image prior to its installation on CPE device 110. The owner device-specific certificates may include customer PKs, customer KEKs, and integrated customer-enterprise key material. According to an embodiment, the image may be prepared with dual signed trusted packages, a dual-signed. Basic Input/Output Operating System (BIOS), owner device-specific certificates, and a certificate import toolkit provided by trusted authority 150 (FIG. 1).

Figure 3:
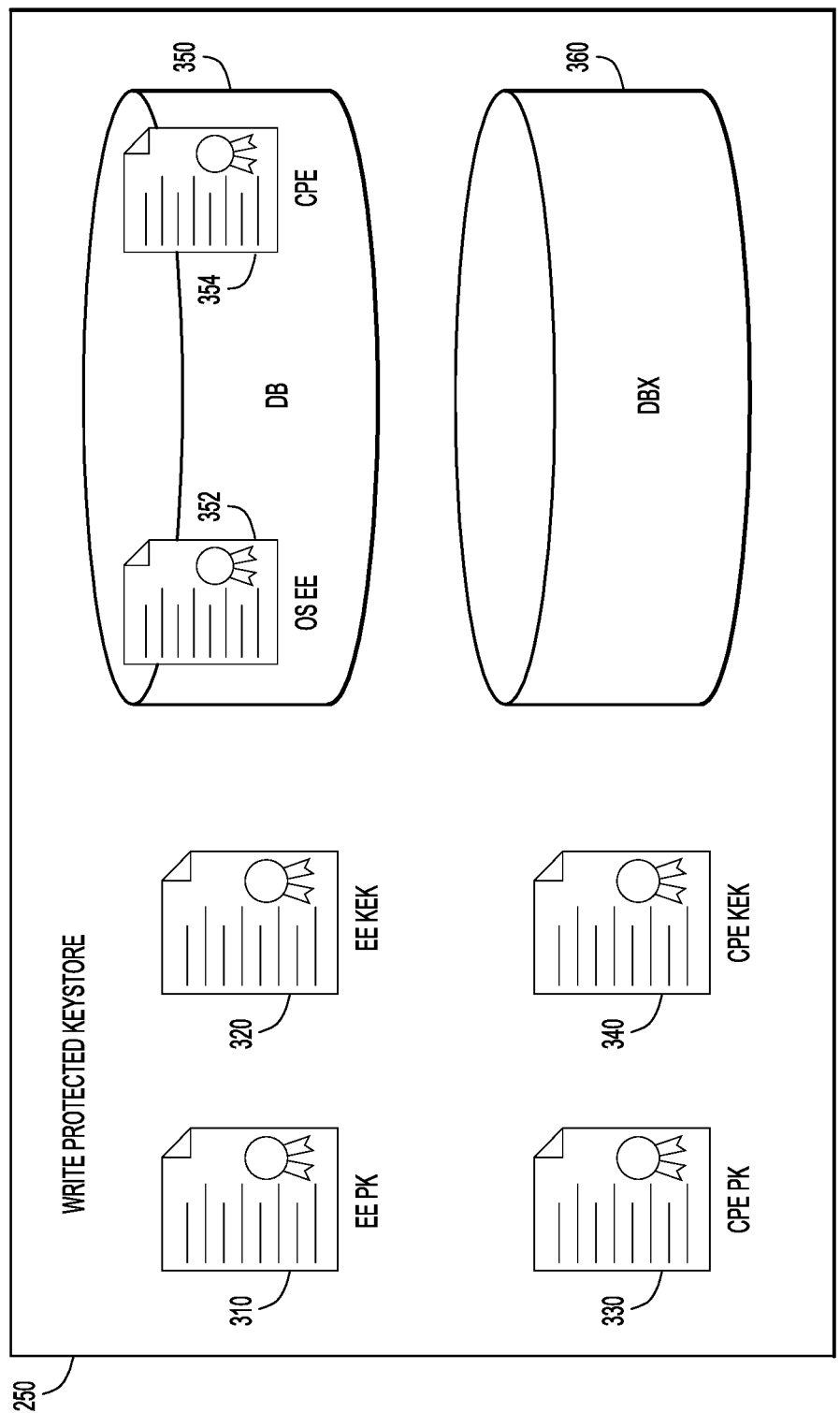
FIG. 3 is a diagram of a write-protected key store in the customer premises equipment device, according to an example embodiment.

Reference is now made to FIG. 3, which shows a block diagram of key store 250 in CPE device 110, according to an example embodiment. As shown in FIG. 3, key store 250 may be write-protected and may store one or more digital certificates, such as X.509 certificates, associated with one or more enterprise entity platform keys 310 and one or more enterprise entity key exchange keys 320, as well as one or more digital certificates associated with one or more customer platform keys 330 and one or more customer key exchange keys 340. X.509 is an example of a standard for a public key infrastructure (PKI) to manage digital certificates and public-key encryption and is part of the Transport Layer Security protocol used to secure web and email communication. X.509 is an ITU-T standard, and specifies formats for public key certificates, certificate revocation lists, attribute certificates, and a certification path validation algorithm. According to an embodiment, CPE device 110 may receive the one or more X.509 certificates associated with a known enterprise entity and/or an owner/administrator entity from trusted authority 160. Key store 250 may further comprise database 350 and relational database 360.

As further shown in FIG. 3, database 350 may store a certificate 352 associated with an image of an operating system ("OS") of the CPE device 110, and signed by a known enterprise entity. Key store 250 may also store one or more security certificates 354 associated with an owner/administrator of the customer network. According to an embodiment, certificate 352 may be associated with an image for an operating system of the CPE device 110, and is signed using a public-private key pair, whose public key may be presented as an X.509 End Entity (EE) certificate to an owner/administrator. According to a further embodiment, an owner administrator of CPE device 110 may validate the image associated with certificate 352 using offline using standard tools, e.g., openssl.

Figure 4:
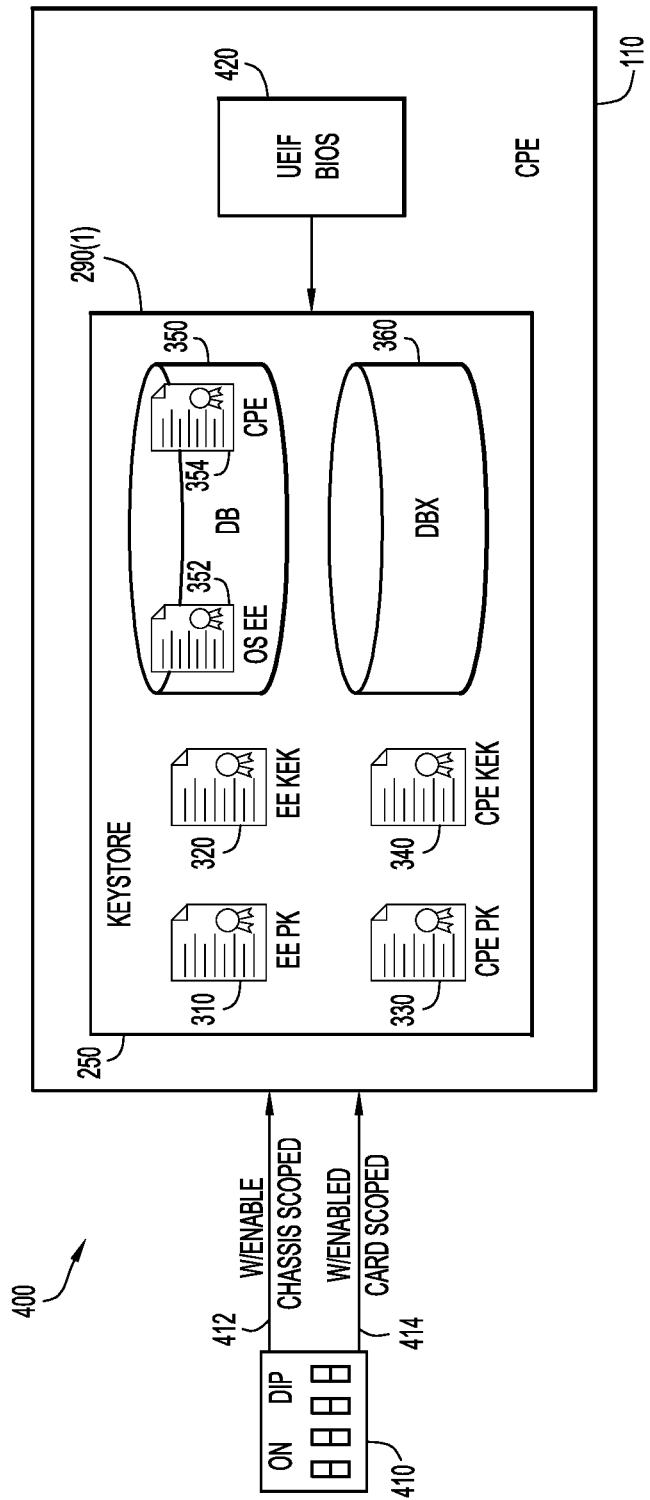
FIG. 4 is a diagram illustrating writing enterprise and/or owner/administrator key material to the key store in the customer premises equipment device, according to an example embodiment.

Reference is now made to FIG. 4 for a block diagram of a write environment 400 and illustrating an enterprise and/or owner/administrator writing key material to key store 250, which may be housed on line card 290(1), for example, according to an example embodiment. As shown in FIG. 4, write environment 400 includes a dipswitch 410, key store 250, and United Extensible Firmware Interface (UEFI) basic input/output system (BIOS) interface 420. UEFI BIOS interface 420 is configured to carry multiple PKs and KEKs, enabling owners/administrators to add PKs and KEKs to key store 250 in CPE device 110. That is, through the UEFI BIOS 420 interface to CPE device 110, owners/administrators may be allowed to modify or customize the key material in key store 250.

As further shown in FIG. 4, key store 250, housed on lined card 290(1), is write-protected and is in communication with dipswitch 410 via lines 412 and 414. When set to "on," e.g., "1," dipswitch 410 may enable an owner/administrator to write key material to key store 250. According to an embodiment, if set to "on," line 412 enables key material to be written to all line cards 290(1)-290(N) in CPE device 110, whereas line 414 enables key material to be written to only a specific line card, e.g., 290(1). According to a further embodiment, each of the line cards 290(1)-290(N) in CPE device 110 may include a single dipswitch that only enables a write operation with respect to that specific line card.

In general, write environment 400 provides for the importation of administrator/owner key material, e.g., PK and KEK, into key store 250 in a secure manner, and the subsequent addition of owner device-specific certificates into the key store database 350 by adding the certificates as authenticated variables. According to an embodiment, the default setting for key store 250 is write-protected, i.e., key material may not be written to key store 250. Therefore, in order to write key material to key store 250, the appropriate switches on dipswitch 410 must first be set to "on," thereby allowing write operations into key store 250. Consequently, the disclosed embodiments provide a mechanism whereby physical presence of an owner/administrator is required prior to writing key material to key store 250, ensuring the integrity of the key material.

Figure 5:
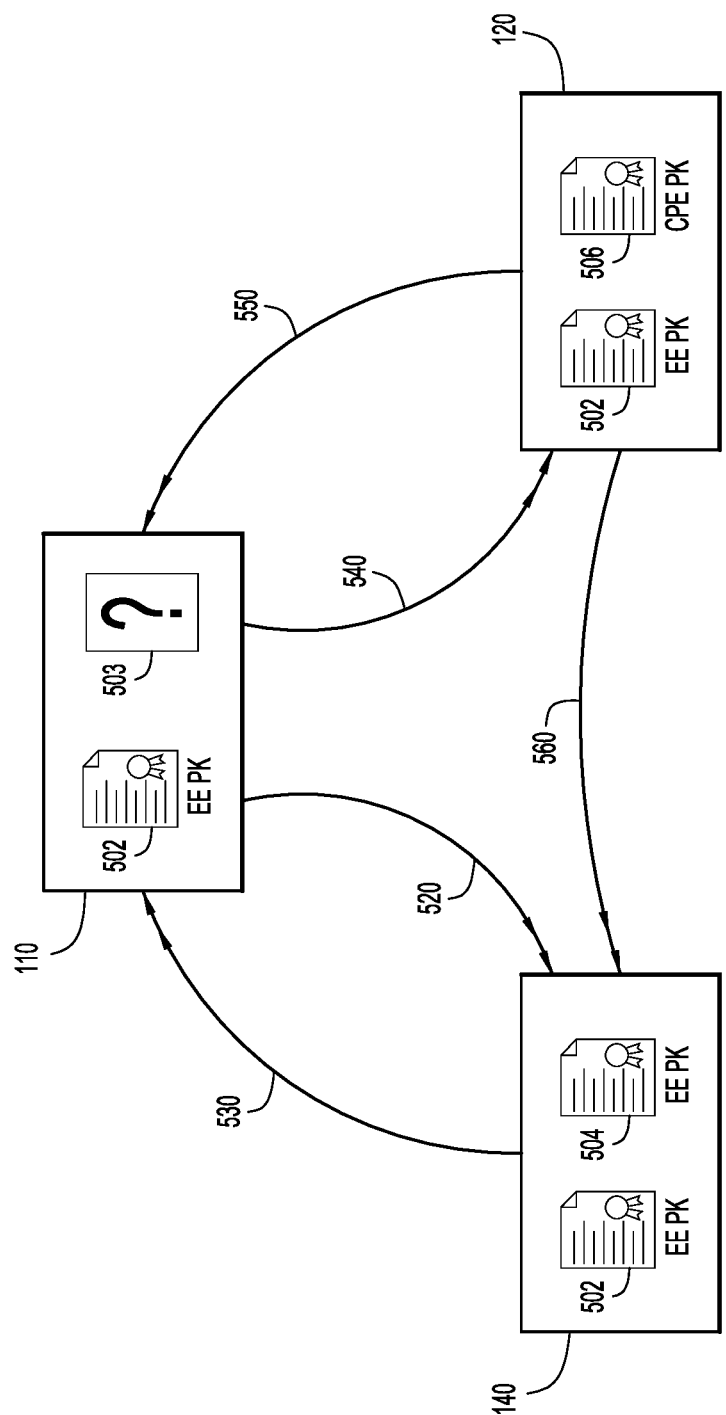
FIG. 5 is a flow diagram illustrating the customer premises equipment device in a setup mode, according to an example embodiment.

With reference to FIG. 5, a flow diagram is shown illustrating CPE device 110 in a setup mode environment, according to an embodiment. Reference may also be made to FIGS. 1-4 in connection with the description of FIG. 5. As shown in FIG. 5, CPE device 110 may include two data structures in memory 210, which may store key materials 502 and 503, respectively, including security certificates, to be used to authenticate images, e.g., software and applications, loaded onto CPE device 110. For example, a first data structure in memory 210 may be initially populated with enterprise key material (EE PK) 502 at the time of the factory build of CPE device 110, i.e., before device 110 is shipped to a customer, and a second data structure in memory 210 may later be populated with customer key material 506. According to an embodiment, enterprise key material 502 may be burned into memory 210 to prevent a third party from tampering with key material 502. Alternatively, enterprise server 140 may communicate enterprise key material, e.g., key material 502, to CPE device 110, which may store the enterprise key material, e.g., 502, in memory 210 substantially contemporaneously with the initial installation of CPE device 110. It should be understood that key materials 502 and 503 may include, but are not limited to, platform keys, key exchange keys, public-private key pairs, and X.509 security certificates received from trusted authority 150.

According to an embodiment, the CPE may operate in three distinct modes, each having different configurations of pre-stored key material. For example, in a setup mode, a single enterprise entity's key material, such as key material 502, may be stored on device 110; in a customer signed image mode, both enterprise key material 502, and customer key material 506, may be loaded and stored onto device 110, enabling device 110 to verify images, using both the customer and manufacturer key material; and in a manufacturer signed image mode, only enterprise key material, such as key material 502 and 504, is loaded and stored onto device 110, enabling device 110 to verify images using only the enterprise key material.

As further shown in FIG. 5, the enterprise entity or owner/administrator of device 110 may initially request enterprise server 140 to transfer enterprise key material onto device 110, at step 520, which may be stored on device 110 as key material 502, at step 530. Thereafter, when CPE device 110 is booted, i.e., powers on, it may enter a setup mode, in which CPE device 110 has limited functionality to determine whether both key materials 502 and 503 have been successfully loaded onto device 110. If device 110 determines that both key materials 502 and 503 have not been successfully loaded onto device 110, the owner/administrator of device 110 may choose to have its own key material, such as key material 506, communicated from device 120, at step 540, and loaded onto device 110 as key material 503, at step 550. Optionally, at step 560, the owner/administrator of device 110 may request the original enterprise key material, such as key material 502, from enterprise server 140, which may be loaded onto device 110 as key material 503. Once complete, CPE device 110 may exit setup mode, allowing an associated image to be successfully installed As discussed further below, all systems and software residing on CPE device 110 need two signatures and/or certificates associated with the systems and/or software prior to their being loaded onto CPE device 110. According to an embodiment, if UEFI BIOS 420, which contains and manages the boot framework for CPE device 110, has been modified so that it determines only one set of key material, such as key material 502, and that the other key material 503 is marked as empty, it will not progress into booting CPE device 110. Rather, CPE device 110 will continue to execute BIOS 420, where CPE device 110 will wait for the owner/administrator to provide key material 503 that can be used for authenticating images. According to an embodiment, if the owner/administrator of CPE device 110 wants to return the CPE device 110 to the enterprise entity for security reasons, the owner/administrator may, using its key material for authentication, instruct CPE device 110 to erase the key material, such as CPE PK 506, on device 110 and revert back to setup mode. Optionally, the owner/administrator key material, such as CPE PK 506, may be replaced with enterprise key material, such as EE PK 502.

In summary, the first time it boots, CPE device 110 requires two sets of key material associated with an image, from some external source, prior to loading an image onto the system. As such, any subsequent image, e.g., software and/or application, loaded onto CPE device 110 after the initial boot must be signed by two sets of key material, cosigned by both an enterprise entity and an owner/administrator of CPE device 110, before it will be installed by CPE device 110. For example, CPE device 110 may initially be set with "enable" on, and a key material device 120, such as a memory stick device, may be plugged into or connected to the CPE device 110 to populate the device with key material associated with an owner/administrator of CPE device 110. According to an embodiment, a boot of CPE device 110 may be verified using public keys associated with an enterprise entity and a certificate associated with an operating system image. According to another embodiment, the operating system image may be authenticated using certificates associated with the enterprise entity and with an owner/administrator of the CPE device 110, which may be imported into a key store 250 (FIG. 4). After the operating system image has been authenticated, the operating system image may be loaded onto CPE device 110 and a reboot may occur.

Figure 6:
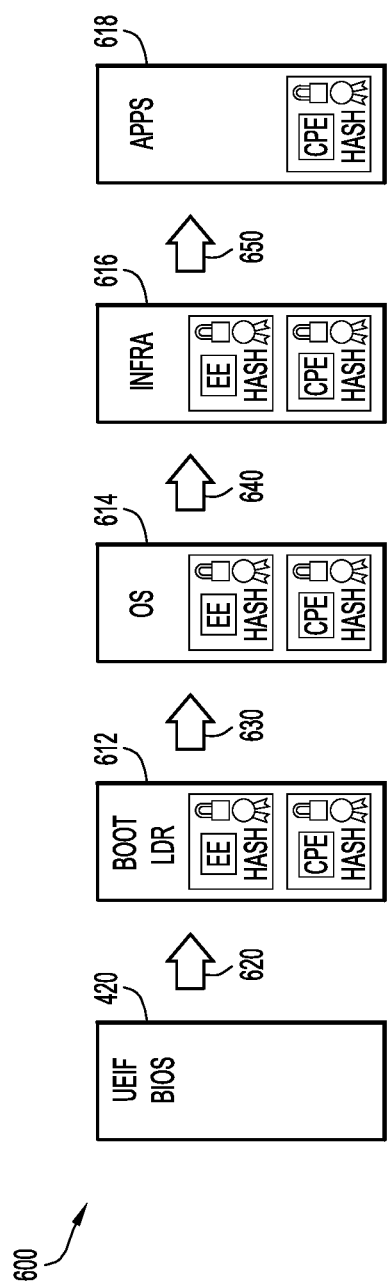
FIG. 6 is a flow diagram illustrating a boot sequence of an image, according to an example embodiment.

With reference to FIG. 6, a system flow diagram is shown illustrating a boot sequence 600 of executable images on CPE device 110, according to an example embodiment. Reference may also be made to FIGS. 1-5 in connection with the description of FIG. 5. As shown in FIG. 6, each of the system images, boot loader image 612, operating system ("OS") image 614, and infrastructure ("INFRA") image 616 has two signatures and/or certificates associated with it, whereas applications (APPS) image 618 has only an owner/administrator signature and/or certificate associated with it. For example, each of the system images 612, 614, and 616 has a hash value associated with the image that has been signed with the public keys of both the enterprise entity and the owner/administrator of CPE device 110. However, as discussed further below, because the enterprise signature associated with image 618 has been authenticated and removed, image 618 may have only one signature and/or certificate associated with the owner/administrator of CPE device 110.

At 620, UEFI BIOS 420 validates the boot loader image 612. BIOS 420 may validate image 612 by using a public key associated with a known enterprise entity to decrypt an enterprise hash value associated with boot loader image 612. BIOS 420 may then use an owner/administrator public key to decrypt the owner/administrator hash value associated with image 612 and compares the two hash values with a calculated hash value associated with image 612. If BIOS 420 determines that the two hash values equal the calculated hash value associated with image 612, a reboot may occur in which BIOS 420 loads and installs the boot loader image 612 onto CPE device 110 to generate boot loader module 240 (FIG. 2). At 630, boot loader module 240 validates OS image 614 by decrypting both enterprise and owner/administrator hash values stored with image 614 and compares the two decrypted hash values with a calculated hash value associated with OS image 614. If boot loader module 240 validates that both hash values are the same as a hash value associated with image 614, a reboot may occur in which boot loader module 240 loads OS image 614 onto CPE device 110 and installs the operating system associated with OS image 614 on CPE device 110.

After the operating system stored by image 614 is validated and installed, a kernel process in OS 614 may, at 640, validate an environment image, e.g., INFRA image 616. As described above, two signed hash values are required before image 616 may be loaded and installed onto CPE device 110. For example, the kernel process may calculate a hash value associated with image 616 and compare the calculated hash value with two hash values stored with INFRA image 616, and if both hash values equal the calculated hash value associated with image 616, the kernel process may allow the environment image 616 to be loaded and installed on CPE device 110.

After boot loader image 612, OS image 614 and INFRA image 616 have been successfully validated and securely installed, it may be desirable to set CPE device 110 into an optional "owner" mode in which the owner/administrator of CPE device 110 may install application images onto device 110. As with the operating system and infrastructure images, an application image must be authenticated prior to being installed on CPE device 110. However, because the owner/administrator is loading the program directly onto CPE device 110, the enterprise signature initially stored with APPS image 618 is authenticated and removed prior to the owner/administrator of CPE device 110 resigning APPS image 618 with a hash value associated with APPS image 618. For example, as shown in FIG. 6, APPs image 618 may be validated, at 650, using only the signed hash value associated with owner/administrator of CPE device 110. If APPS image 618 is successfully validated, INFRA image 616 may allow the APPS image 618 to be loaded and installed on CPE device 110.

Figure 7:
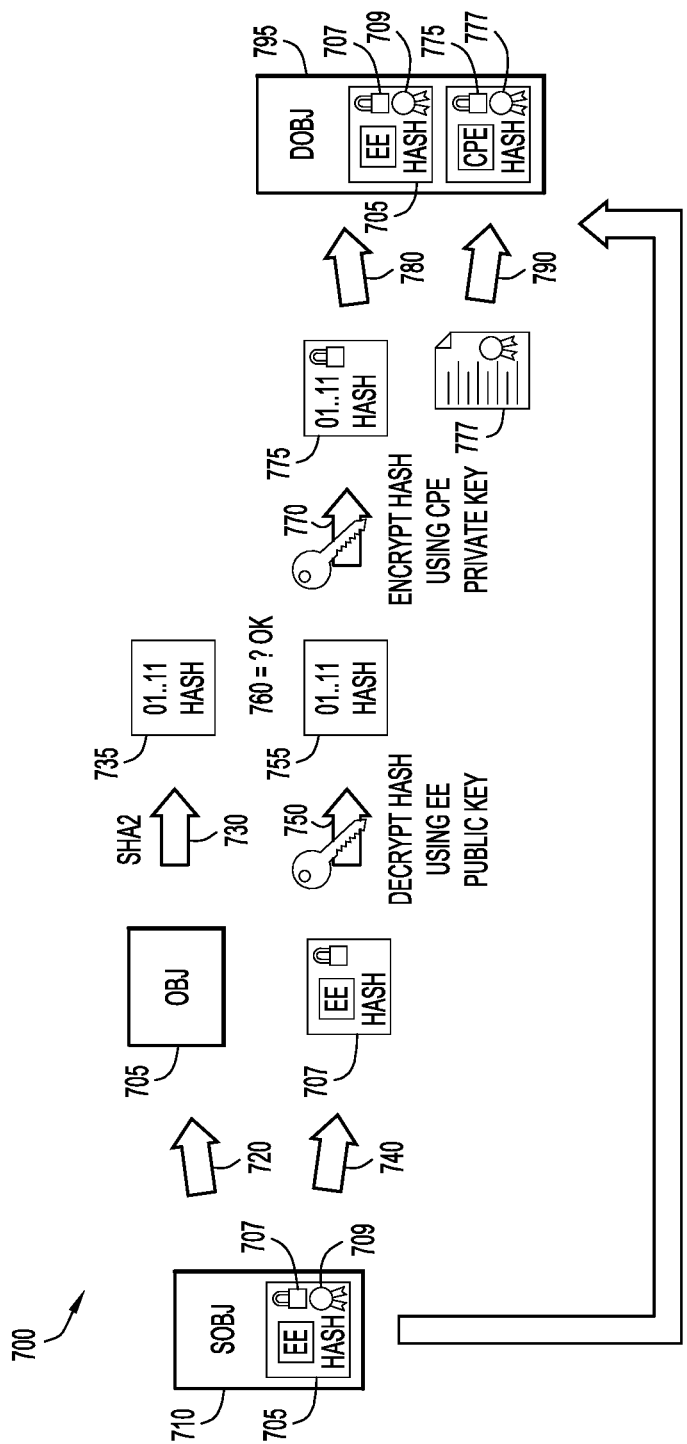
FIG. 7 is a flow diagram illustrating a method for dual-signing an image, according to an example embodiment.

With reference to FIG. 7, a system flow diagram is shown illustrating a method 700 for dual-signing an image, according to an example embodiment. As discussed above, an image must be signed by two entities prior to being loaded and installed onto CPE device 110. Accordingly, as shown in FIG. 7, a signed object (SOBJ) image 710, may comprise an object file (OBJ) 705, an encrypted hash value 707 associated with the OBJ file 705, which may be signed with a private key associate with a known enterprise entity, and a security certificate 709 associated with the known enterprise entity that signed hash value 707. At 720, OBJ file 705 is extracted from the signed SOBJ image 710 and, at 730, a hash value 735 associated with the object (OBJ) file 705 is generated. For example, a secure hash algorithm ("SHA"), e.g., SHA2, is performed on object file (OBJ) 705 to generate the hash value 735. It should be understood, however, that any one-way algorithm may be performed on the OBJ file 705 to generate a computational value that may be used to authenticate OBJ file 705.

At 740, the encrypted hash value 707 is extracted from signed SOBJ image 710 and the certificate 709 associated with the enterprise entity that signed hash value 707 is validated using at least the information included in certificate 709. According to an embodiment, the certificate 709 may be generated by trusted authority 150 (FIG. 1) and may include information identifying a public key associated with a specific enterprise entity and a validity period during which the certificate 709 is valid. According to a further embodiment, a known enterprise entity may generate encrypted hash value 707, sign the encrypted hash value 707 with a private key uniquely associated with the known enterprise entity, and attach the signed encrypted hash value 707 and certificate 709 to OBJ file 705 to generate the signed SOBJ image 710, which may be stored in key store 250 by the enterprise entity prior to shipping CPE device 110.

If the certificate 709 associated with encrypted hash value 707 and the enterprise entity is validated, at 750, the encrypted hash value 707 is decrypted, using a public key associated with the private enterprise key used to encrypt hash value 707, to generate encrypted hash value 755. At 760, the hash values 735 and 755 are compared to determine whether they are equal. If they are equal, at 770, hash value 755 is encrypted using a private encryption key associated with the owner/administrator of CPE device 110 to produce hash value 775, and a certificate 777 associated with the owner/administrator of CPE device 110 is generated. At 780, hash value 775 is attached to signed SOBJ image 710 and, at 790, certificate 777 is also attached to the signed SOBJ image 710 to generate dual-signed object (DOBJ) image 795. Dual-signed DOBJ image 795 therefore may include OBJ file 705, encrypted hash value 707 signed by a known enterprise entity, certificate 709 associated with the known enterprise entity and hash value 707, encrypted hash value 775 signed by an owner/administrator of CPE device 110, and certificate 777 associated with the owner/administrator and hash value 775. Accordingly, because the dual-signed DOBJ image 795 is signed by both a known enterprise entity and an owner administrator of CPE device 110, DOBJ image 795 may be loaded onto CPE device 110 and authenticated using the techniques described herein.

In general, therefore, parts of the functions of the CPE device 110 are allowed to be effectively closed from unauthorized intrusion, thereby preserving the integrity of the hardware and software running on CPE device 110, such as a BIOS 420, a bootloader image 612, an OS image 614, and an INFRA image 616. The dual-signing image method disclosed herein also provides supply chain integrity to a customer, while providing a trusted platform that allows for trust to be imparted to a software stack.

Figure 8:
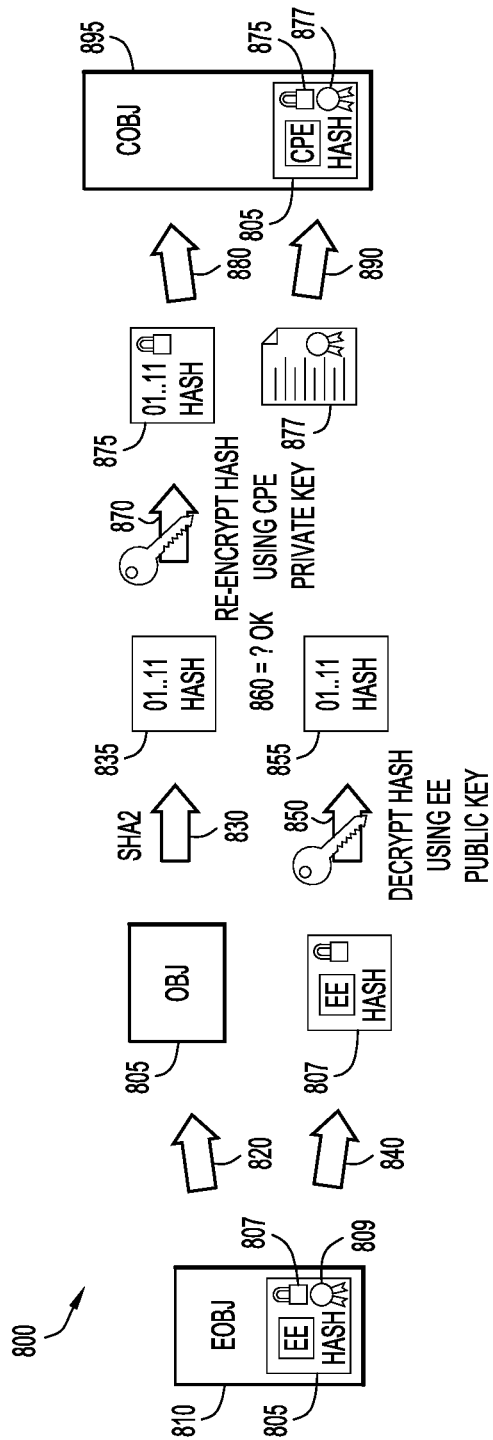
FIG. 8 is a flow diagram illustrating a method for re-signing an image, according to an example embodiment.

With reference to FIG. 8, a system flow diagram is shown illustrating a method 800 for resigning an image, according to an example embodiment. As described above, in an "owner" mode, an application image may be resigned by an owner/administrator prior to being loaded and installed on CPE device 110. Accordingly, as shown in FIG. 8, an enterprise object (EOBJ) image 810, signed by a known enterprise entity, may comprise an object file (OBJ) 805, an encrypted hash value 807 associated with OBJ file 805, which may be signed with a private key associated with a known enterprise entity, and a certificate 809 associated with the known enterprise entity that signed hash value 807. At 820, the OBJ file 805 is extracted from EOBJ image 810 and, at 830, a hash value 835 associated with the OBJ file 805 is generated. For example, a secure hash algorithm ("SHA"), e.g., SHA2, is performed on objects file 805 to generate the hash value 835. It should be understood, however, that any one-way algorithm may be performed on objects file 805 to generate a computational value that may be used to authenticate object file 805.

At 840, the encrypted hash value 807 is extracted from EOBJ image 810 and the certificate 809 associated with the enterprise entity that signed hash value 807 is validated using at least the information included in certificate 809. If the certificate is validated, at 850, the encrypted hash value 807 is decrypted, using a public key associated with the private enterprise key used to encrypt hash value 807, to generate encrypted hash value 855. At 860, the hash values 835 and 855 are compared to determine whether they are equal. If they are equal, at 870, hash value 855 is encrypted using a private encryption key associated with the owner/administrator of CPE device 110 to produce hash value 875, and a certificate 877 associated with the owner/administrator of CPE device 110 is generated. At 880, hash value 875 is attached to OBJ file 805 and, at 890, certificate 877 is also attached to OBJ file 805 to generate customer object (COBJ) image 895 that includes a single encrypted hash value associated with OBJ file 805 that has been resigned by the owner/administrator of CPE device 110.

In general, after INFRA image 616 has been authenticated and installed, the embodiment described in connection with FIG. 8 allows for an optional "owner" mode, in which owners/administrators of CPE device 110 may securely install applications on CPE device 110 at the premises of the owner/administrator.

Figure 9:
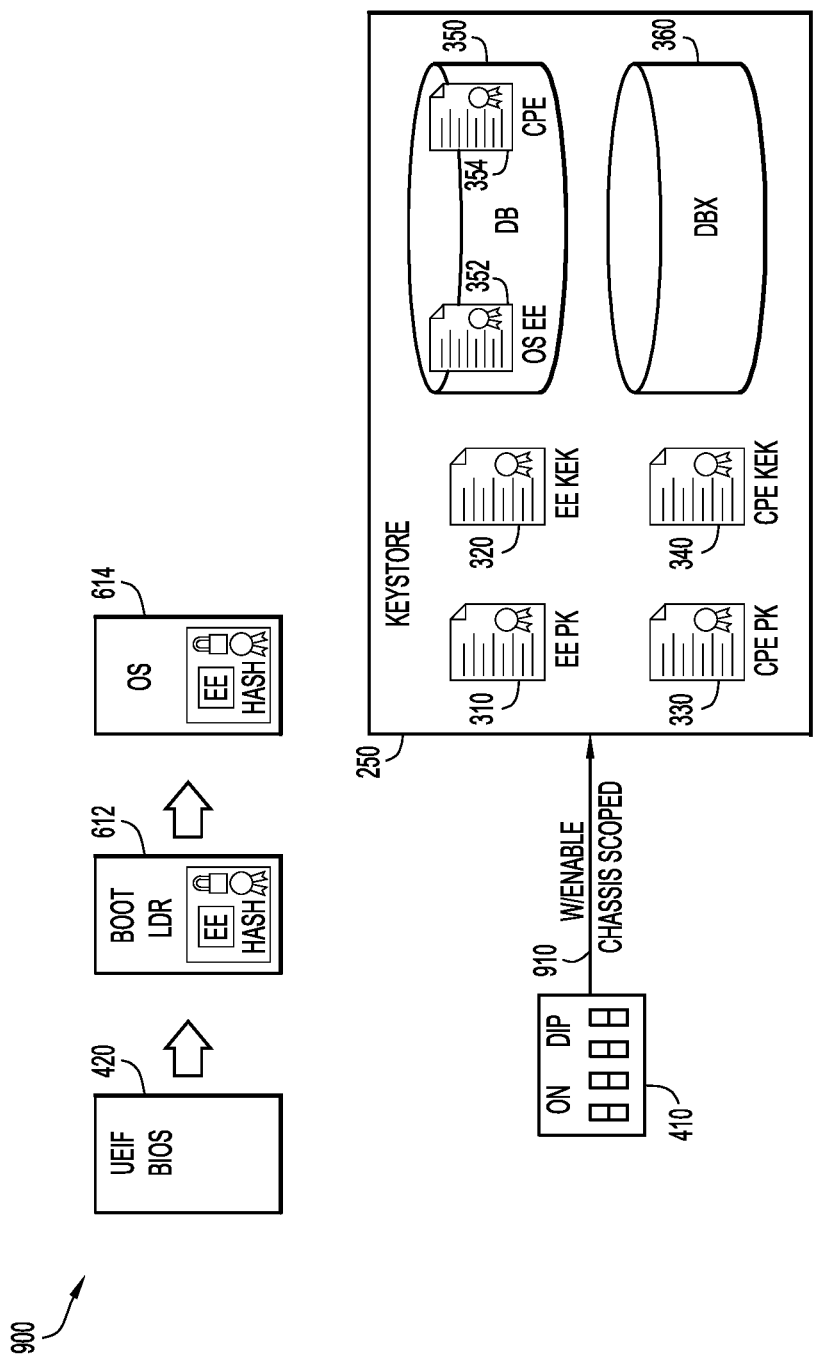
FIG. 9 is a flow diagram illustrating a method for securely writing to a key store in setup mode, according to an example embodiment.

With reference to FIG. 9, a flow diagram illustrating a method 900 for securely writing key material to a key store 250 to authenticate and load an OS image 614 on CPE device 110, according to an embodiment. As shown in FIG. 9, key store 250 may be write-protected and may store one or more X.509 certificates associated with one or more enterprise entity platform keys (EE PK) 310 and one or more enterprise entity key exchange keys (EE KEK) 320, as well as one or more X.509 certificates associated with one or more customer platform keys (CPE PK) 330 and one or more customer key exchange keys (CPE KEK) 340. Key store 250 may further comprise database 350 and relational database 360. As further shown in FIG. 3, database 350 may store a certificate (OS EE) 352 associated with a bootable image that is signed by an enterprise entity and one or more security certificates (CPE EE) 354 associated with an owner/administrator. As shown, the bootable image associated with certificate 352 may be an operating system ("OS").

As further shown in FIG. 9, key store 250 is write-protected and is in communication with dipswitch 410 via line 910, which, when set to "on," e.g., "1," may allow an owner/administrator to write key material to key store 250. According to an embodiment, an owner/administrator of CPE device 110 does not require a trusted source to sign any of their credentials in order to deploy key material onto CPE device 110. In general, if the key store 250 mandates dual-signed images, e.g., through updated requirements of UM BIOS 420, CPE device 110 will only install a bootloader that is dual-signed and verifiable using the certificates in key store 250. Similar processes may be used for software upgrades on CPE device 110.

According to an embodiment, an update to UEFI BIOS 420 may be performed using a BIOS capsule update, and a signed UEFI BIOS 420 may be provided by a trusted source, e.g., a known enterprise entity. A trusted source may also provide a tool that may be used to add additional, e.g., owner/administrator-specific, signatures to an update such that a new UpdateCapsule may be generated. The updated UEFI BIOS then may be placed in a known location in memory 220 of the CPE device 110 (FIG. 2) by the UEFI BIOS 420, and a system management mode (SMM) in the BIOS may copy over the new UEFI BIOS 420 and reset.

Upon insertion of line card 290(N) into CPE device 110, a local dipswitch 410 may be set to "on," enabling key store 250 to be populated with key material, e.g., from key material device 120, and the CPE device 110 to initiate a basic operating system boot. For example, when line card 290(N) is inserted into CPE device 110, a per-card dipswitch may be toggled "on" as the card 290(N) is inserted. An image boot may be held in reset at OS image 614, as shown in FIG. 6, and a user or operator may import owner/administrator specific key material onto the line card from key material device 120. If needed, UEFI BIOS 420 and/or a bootloader image 612 may be updated. Upon updating the BIOS 420 and/or the bootloader image 612, the dipswitch 410 may be reset and the line card 290(N) may be rebooted, and an operating system may reimage itself to a reference image.

In general, the embodiments presented herein allows for multiple key material to be present in key store 250. For example, when CPE device 110 is shipped to a customer, it may be shipped with key material and credentials associated with an enterprise entity, e.g., enterprise key encryption keys, enterprise public keys, and certificates associated with the enterprise entity. The key material and credentials are stored in database 350. When an owner/administrator of CPE device 110 receives the CPE device 110, the owner/administrator may populate their key materials, e.g., public keys, key encryption keys, and certificates, into database 350. However, because key store 250 is write-protected, dipswitch 410 must be set to "on," causing dipswitch 410 to send a signal via line 910 to key store 250 enabling an owner/administrator of CPE device 110 to write their key material to key store 250. It should be understood, that any suitable hardware-based mechanism may be used to transition key store 250 to a write-enabled mode. For example, a button on CPE device 110 or a screwdriver may be used. This signal generated and sent by the dipswitch serves as an authorization signal used for determining whether the external device (dipswitch or button) is directly connected to the CPE device 110.

After the owner/administrator of CPE device 110 completes a write operation of key material into database 350, the owner/administrator of CPE device 110 may revert the settings on dipswitch 410 to "off," thereby transitioning key store 250 back to a write-protected mode. Accordingly, software may only write onto CPE device 110 if the associated mechanical/hardware settings are set to permit the software to write onto the device 110. If the mechanical/hardware settings are not set to allow write operations to occur, then any write operation to CPE device 110 will fail.

According to an embodiment, when key store 250 is transitioned from write-protected to write-enabled, an alarm is sent from CPE device 110 to network controller 130 (FIG. 1) to alert network controller 130 that CPE device may be tampered with. Furthermore, once the write operation on CPE device 110 is finished, CPE device 110 will continue to repeatedly warn the owner/administrator and the network controller 130 that key store 250 remains in a write-enabled mode. Optionally, CPE device 110 will automatically revert key store 250 to a write-protected mode and place CPE device into a "safe" mode having limited functionality.

In general, therefore, dip-switch 410, or any suitable hardware/mechanical mechanism, ensures that an owner/administrator of CPE device 110 has physical control of the CPE device 110 before a write operation to CPE device 110 will be allowed. Furthermore, if an unauthorized write operation is initiated on the device 110, an alarm is sent to a network controller 130 alerting the network controller 130 to the write operation, and, in response, controller 130 may monitor CPE device 110 remotely at a centralized location, providing an additional safeguard for CPE device 110 to ensure that the device 110 is not under a remote-based attack. Additionally, with respect to software upgrades on CPE device 110, a standard conventional software upgrade may be performed using the dual-sign embodiments disclosed herein as well as an optional resign for application packages installed by an owner/administrator of the CPE device 110.

For card removal, and remote memory access ("RMA"), an owner/administrator may use UEFI BIOS 420 authenticated variables to update their KEK keys, or credentials they have populated in database 350 and/or a database 360. Furthermore, when a line card 290(N) is removed from CPE device 110, owner/administrator specific credentials, e.g., certificate 354, may be removed using authenticated variables in sequence. For example, certificate 354, and substantially any additional contents of database 350 generated using CPE KEK 340 may be removed. CPE KEK 340 then may be removed using CPE PK 330, and then CPE PK 330 may be removed. It should be appreciated that in some instances, removal may not be possible.

If removal is not possible, a line card may be inserted into an empty chassis in CPE device 110, with a card specific write-enable dipswitch turned on. Using a tool provided by a trusted source, CPE PK 330 and CPE KEK 340 may be erased, and the contents of database 350 may be cleared. According to an embodiment, a trusted source may provide authenticated variables which may be used to restore a certificate associated with an enterprise entity in database 350. According to a further embodiment, a trusted source, e.g., a known enterprise entity, may also clear the contents of database 350. For example, if a trusted source receives a card with extra credentials, the card may be placed in an empty chassis, and excess credentials may be removed from key store 240, before proceeding. Key rollovers may be accomplished using standard UEFI authenticated variables. However, it should be appreciated that neither a trusted source, nor a malicious agent, may deploy anything on the devices of a customer or alter the credentials of the customer. Additionally, an owner/administrator of CPE device 110 generally may not tamper with the credentials of a trusted source, e.g., certificates 310 and 320, and, as such, supply chain integrity of CPE device 110 may be ensured.

Figure 10A:
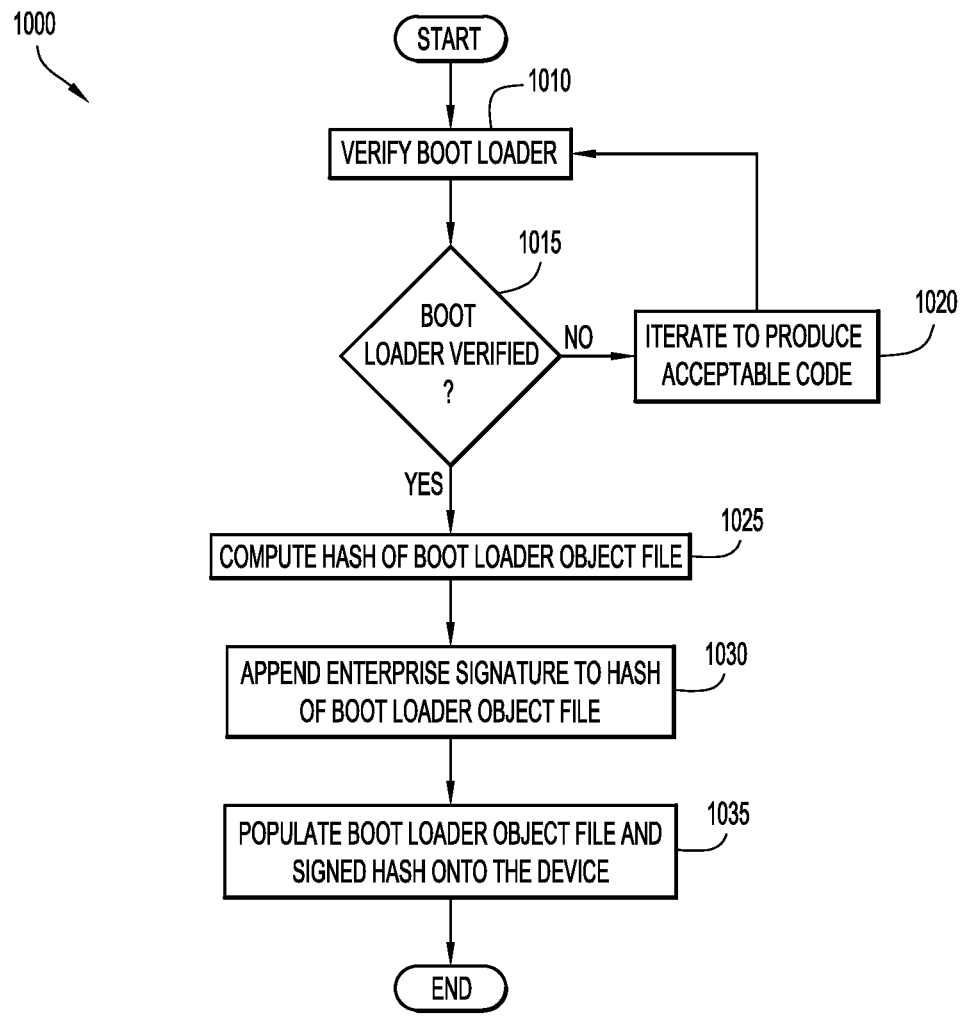
FIGS. 10A and 10B are flowcharts depicting operations performed to dual-sign an image on the customer premises equipment device, according to an example embodiment.
Figure 10B:
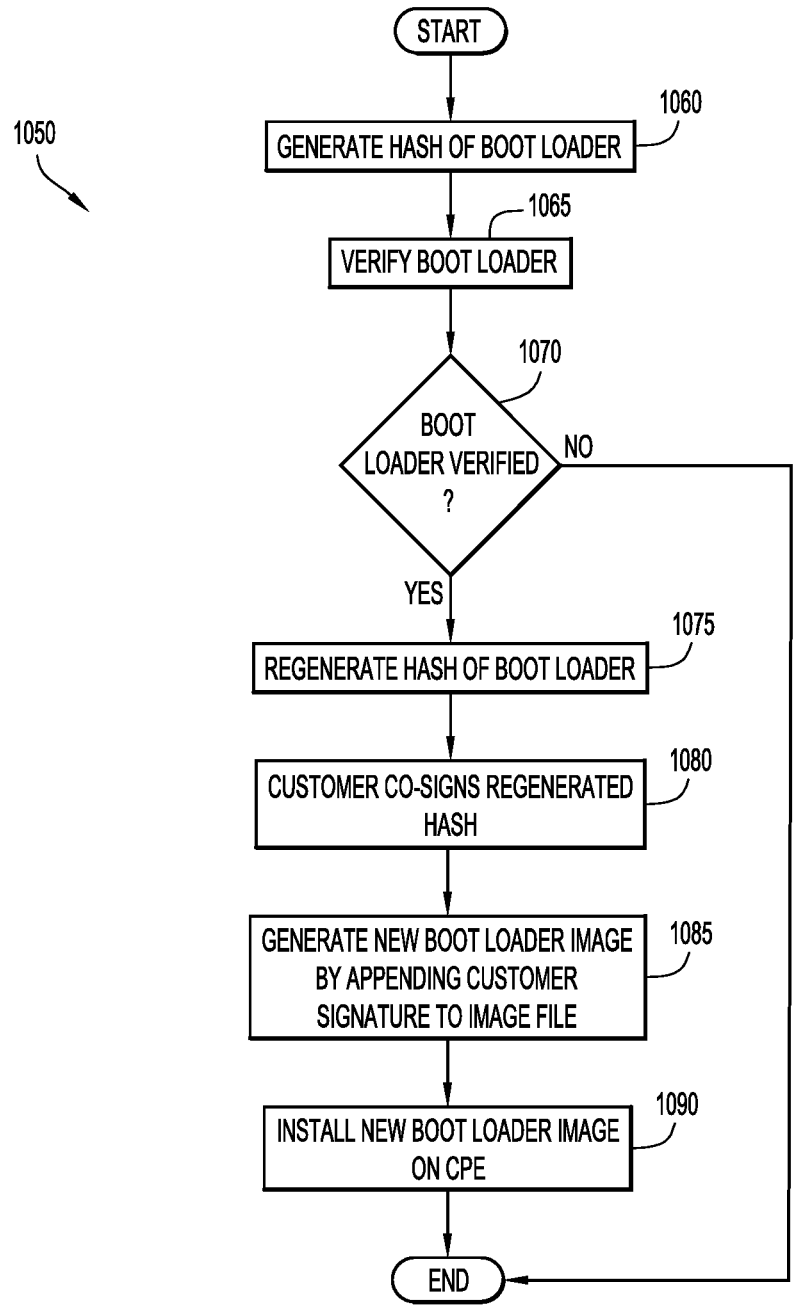

With reference to FIGS. 10A and 10B, flowcharts are shown depicting example operations 1000 and 1050 performed to dual-sign an executable image on a computing device, such as the aforementioned CPE device 110, according to an example embodiment. Specifically, FIG. 10A first depicts process 1000, performed by a manufacturing or enterprise entity to populate a boot loader object file signed by an enterprise entity onto CPE device 110. FIG. 10B depicts process 1050 performed to authenticate the signed boot loader object file and, if successfully authenticated, to append a customer's signature onto the boot loader object file before the object file is installed on CPE device 110. It should be understood that, while FIGS. 10A and 10B depict operations performed to dual-sign a bootloader object file, processes 1000 and 1050 may be performed on any software image or file that is provided by a manufacturer, or other enterprise entity, that is designed to be installed onto CPE device 110, including, but not limited to, operating system images, e.g., OS image 614, and/or platform images, e.g., image 616. Reference may also be made to FIGS. 1-9 in connection with the description of FIGS. 10A and 10B.

As shown in FIG. 10A, initially, at 1010, during a build process, e.g., by a manufacturing or enterprise entity, CPE device 110 verifies boot loader source code. If, at 1015, the boot loader source code is successfully verified, operation proceeds to 1025, otherwise operation proceeds to 1020. At 1020, a new iteration boot loader source code is generated and operation returns to 1010.

At 1025, a hash value of the boot loader object file is generated using a hash algorithm, e.g., SHA2, and is signed, e.g., by hardware security module 215, with an encryption key associated with device 110. At 1030, a public key uniquely associated with device 110 is appended to the generated hash value.

At 1035, the boot loader object file and/or the signed hash value of the boot loader object file are populated onto device 110, and method 1000 ends. According to an embodiment, the boot loader object file and/or signed hash value of the boot loader object file may be populated on device 110 by a manufacturing or enterprise entity. According to a further embodiment, the boot loader object file and/or signed hash value may be downloaded onto device 110 by an owner/administrator of device 110 from enterprise server 140.

As shown in FIG. 10B, initially, at 1060, hardware security module 215 generates a hash value associated with the boot loader object file, and, at 1065, authentication module 230 verifies the authenticity of the boot loader object file. For example, authentication module 230 may verify the authenticity of the boot loader object file by comparing the hash value of the boot loader object file generated by hardware security module 215 with the hash value populated onto device 110 to determine whether they are the same. At 1070, if authentication module 230 successfully verifies the boot loader object file, operations proceed to step 1075, otherwise method 1050 ends.

At 1075, hardware security module 215 regenerates a hash value of the boot loader image and, at 1080, co-signs the regenerated hash value for the boot loader object file with an encryption key associated with an owner/administrator of the CPE device 110. According to an embodiment, hardware security module 240 may generate a public/private key pair associated with device 110 and sign the regenerated hash value using the private key associated with device 110. At 1085, hardware security module 215 generates a new boot loader image file 612, including both hash values signed by the enterprise entity and the owner/administrator of CPE device 110, by appending a public key associated with CPE device 110. At 1090, the new boot loader image file 612 is installed on CPE device 110, and method 1050 ends.

Figure 11:
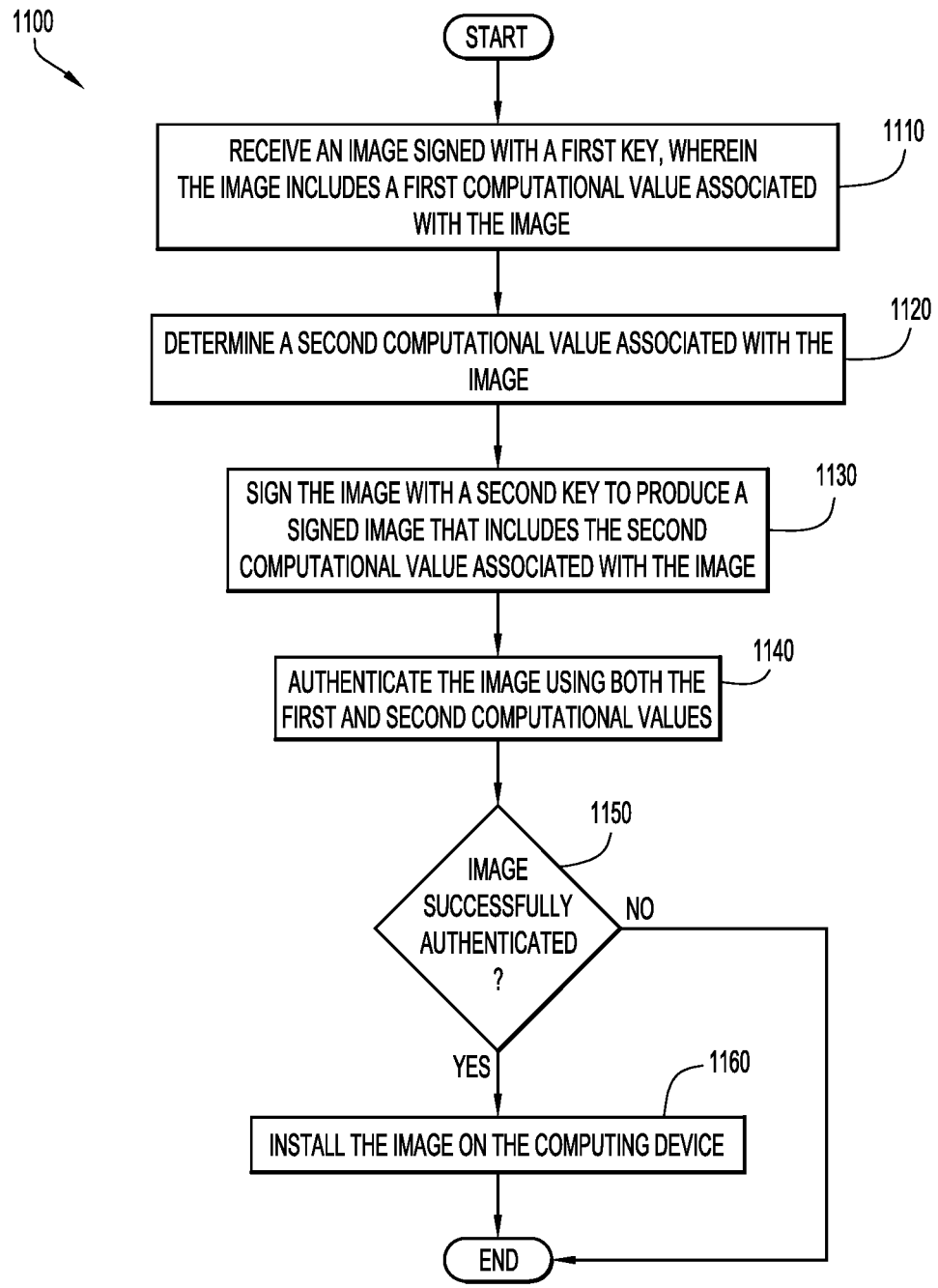
FIG. 11 is a flowchart depicting operations performed to verify and install an image on the customer premises equipment device, according to an example embodiment.

With reference to FIG. 11, a flowchart is shown depicting example operations 1100 performed to verify and install an image on a computing device, Reference is also made to FIGS. 1-9 for purposes of this description.

Initially, at 1110, a computing device receives an image signed with a first key, wherein the image includes a first computational value associated with the image. At 1120, the computing device determines a second computational value associated with the image.

At 1130, the computing device signs the image with a second key to produce a signed image that includes the second computational value associated with the image.

At 1140, the computing device authenticates the image using both the first and second computational values. At 1150, it is determined whether the image was successfully authenticated. If the image is successfully authenticated, operation proceeds to 1160, otherwise operation 1100 ends. At 1160, the computing device installs the image and operation 1100 ends.

The embodiments disclosed herein allow an owner/administrator of a computing device to securely install a bootable image onto a computing device. For example, the owner/administrator may set a dipswitch in communication with the computing device to "on," transitioning a key store on the computing device to a write-enabled state, allowing key material associated with the owner/administrator to be written to the key store. Using the key material in the key store, the computing device may create an image that is a dual-signed image that is, signed by both an enterprise entity and the owner/administrator of the CPE device 110. The computing device may then be rebooted with the dual-signed image. Additionally, a dual-signed infrastructure package may be provided for software updates to an owner/administrator specific device, and optional resign application packages may also be provided.

Advantages of the embodiments include providing an additional layer of security to control/restrict the ability of third parties to maliciously attack customer-owned network devices. In certain deployments, such as government and financial institutions, there is a requirement that network devices provide secure and continuous services. Thus, the computing device (CPE device) referred to herein may be a network switch, router, firewall, etc., that is to be deployed in certain environments where this additional layer of security is desired. According to embodiments presented herein, software may only be installed on a network device if the software has been hashed and signed by both an enterprise entity and an owner/administrator of the network device. The signatures associated with both the enterprise entity and the owner/administrator may be authenticated and the associated hash values compare to ensure that the software and/or update has not been altered by a third party. In so doing, the network device verifies that authenticity of the software, ensuring that only authenticated images are installed on the network device.

In accordance with one embodiment, a method and system are disclosed in which a dual-signed image is validated prior to installation on a customer premises equipment. The image is signed by both (a) the manufacturer of the customer premises equipment and (b) the owner/administrator of the customer premises equipment, i.e., a trusted source. In so doing, the owner/administrator of the device is able to verify that the image is authenticated by both the production entity, i.e., source of the image, and the enterprise entity, i.e., owner/administrator of the device, to determine that the image is a valid installation/upgrade image that may be safely installed.

The embodiments presented herein also provide for a method to ensure the integrity of key materials stored on a network device and used to authenticate images to be loaded onto the device. For example, a dipswitch, or suitable hardware/mechanical means, in communication with the network device, needs to be set to "on" before any key material may be written into a key store on the network device, ensuring the physical presence of an owner/administrator seeking to write key material to the device. Furthermore, if the dipswitch is not turned to "off" after the write operation is completed, an alarm is sent to a centralized network controller, alerting the controller that the network device may be compromised, thereby preserving the integrity of the network devices within the customer network.

In one form, a method is provided comprising: at a computing device: receiving an image that has been signed with a first key, wherein the image includes a first computational value associated with the image; determining a second computational value associated with the image; signing the image with a second key to produce a signed image that includes the second computational value associated with the image; authenticating the image using both the first and second computational values; and based on the authenticating, installing the image on the computing device.

In another form, an apparatus is provided comprising: a network interface unit that enables network communications; and a processor, coupled to the network interface unit, and configured to: receive an image that has been signed with a first key, wherein the image includes a first computational value associated with the image; determine a second computational value associated with the image; sign the image with a second key to produce a signed image that includes the second computational value associated with the image; authenticate the image using both the first and second computational values; and install the image based on the authentication.

In yet another form, a non-transitory processor readable medium storing instructions is provided that, when executed by a processor, cause the processor to: receive an image that has been signed with a first key, wherein the image includes a first computational value associated with the image; determine a second computational value associated with the image; sign the image with a second key to produce a signed image that includes the second computational value associated with the image; authenticate the image using both the first and second computational values; and based on the authenticating, install the image on the computing device.

The above description is intended by way of example only. Various modifications and structural changes may be made therein without departing from the scope of the concepts described herein and within the scope and range of equivalents of the claims.

What is claimed is:

1. A method comprising:
    at a computing device in a user network:
        obtaining an image that includes an object file and a signature, wherein the signature is generated by encrypting a first computational value with a first private encryption key associated with an enterprise entity that built the computing device, wherein the first computational value is generated from a first one-way process performed on the object file;
        performing a second one-way process on the object file of the image to generate a second computational value associated with the image;
        decrypting the first computational value using a public encryption key uniquely associated with the first private encryption key to generate a third computational value;
        authenticating the image by determining that the second computational value matches the third computational value;
        in response to authenticating the image, encrypting the third computational value with a second private encryption key associated with a user of the computing device to generate a fourth computational value;
        producing a signed image that includes the object file, the signature, and the fourth computational value; and
        installing the signed image on the computing device.

2. The method of claim 1, wherein performing the second one-way process further comprises executing a hash algorithm on the image.

3. The method of claim 1, further comprising:
    verifying that the first private encryption key and the second private encryption key are valid.

4. The method of claim 3, wherein verifying that the first private encryption key and the second private encryption key are valid further comprises determining that a certificate associated with the first private encryption key has not expired and that a certificate associated with the second private encryption key has not expired.

5. The method of claim 4, wherein installing the signed image further comprises verifying that the computing device is authorized to install the signed image.

6. The method of claim 5, wherein verifying that the computing device is authorized to install the signed image further comprises:
    obtaining an authorization signal from an external device; and
    determining that the authorization signal is valid.

7. The method of claim 6, wherein determining that the authorization signal is valid further comprises determining that the external device is directly connected to the computing device.

8. The method of claim 6, wherein the external device is a dipswitch or a button.

9. An apparatus comprising:
    a network interface unit configured to enable network communications in a user network; and
    a processor, coupled to the network interface unit, and configured to:
        obtain an image that includes an object file and a signature, wherein the signature is generated by encrypting a first computational value with a first private encryption key associated with an enterprise entity that built the apparatus, wherein the first computational value is generated from a first one-way process performed on the object file;
        perform a second one-way process on the object file of the image to generate a second computational value associated with the image;
        decrypt the first computational value using a public encryption key uniquely associated with the first private encryption key to generate a third computational value;
        authenticate the image by determining that the second computational value matches the third computational value;
        in response to authenticating the image, encrypting the third computational value with a second private encryption key associated with a user of the apparatus to generate a fourth computational value;
        produce a signed image that includes the object file, the signature, and the fourth computational value; and
        install the signed image on the apparatus.

10. The apparatus of claim 9, wherein the processor is further configured to:
    verify that the first private encryption key and the second private encryption key are valid.

11. The apparatus of claim 10, wherein the processor is further configured to:
    determine that a certificate associated with the first private encryption key has not expired and that a certificate associated with the second private encryption key has not expired.

12. The apparatus of claim 9, wherein the processor is further configured to:
   execute a hash algorithm on the image.

13. The apparatus of claim 9, wherein the processor is further configured to:
   verify that the apparatus is authorized to install the signed image.

14. The apparatus of claim 13, wherein the processor is further configured to:
   obtain an authorization signal from an external device; and
   determine that the authorization signal is valid.

15. The apparatus of claim 14, wherein the processor is further configured to:
   determine that the external device is directly connected to the apparatus.

16. The apparatus of claim 14, wherein the external device is a dipswitch or a button.

17. A non-transitory processor readable medium storing instructions that, when executed by a processor of a computing device in a user network, cause the processor to:
   obtain an image that with includes an object file and a signature, wherein the signature is generated by encrypting a first computational value with a first private encryption key associated with an enterprise entity that built the computing device, wherein the first computational value is generated from a first one-way process performed on the object file;
   perform a second one-way process on the object file of the image to generate a second computational value associated with the image;
   decrypt the first computational value using a public encryption key uniquely associated with the first private encryption key to generate a third computational value;
   authenticate the image by determining that the second computational value matches the third computational value;
   in response to authenticating the image, encrypt the third computational value with a second private encryption key associated with a user of the computing device to generate a fourth computational value;
   produce a signed image that includes the object file, the signature, and the fourth computational value; and
   install the signed image on the computing device.

18. The non-transitory processor readable medium of claim 17, further comprising instructions that, when executed by the processor, cause the processor to:
   verify that the first private encryption key and the second private encryption key are valid.

19. The non-transitory processor readable medium of claim 18, further comprising instructions that, when executed by the processor, cause the processor to:
   determine that a certificate associated with the first private encryption key has not expired and that a certificate associated with the second private encryption key has not expired.

20. The non-transitory processor readable medium of claim 18, further comprising instructions that, when executed by the processor, cause the processor to:
   execute a hash algorithm on the image.

* * * * *